Patented May 7, 1935

2,000,843

UNITED STATES PATENT OFFICE 2,000,843

COMPOSITION FOR KILLING INSECTS AND FUNGI

Paul Janke, Ascona, Switzerland, assignor to Dehne & Co. Orbene-Gesellschaft, Brissago, Switzerland No Drawing. Application July 10, 1933, Serial No. 679,790. In Germany July 13, 1932

1 Claim. (Cl. 167—22)

My invention relates to improvements in compositions for killing insects and fungi, and more particularly such insects and fungi which are injurious to fruit trees, vine, flowers and vegetables, such as the schizoneura lanigera, pemphigus (yceria purchasi), the plasmopara, the apple mildew, and the like.

The composition consists of 33 parts of soft soap, (green soap) 11 parts of a 2% cresol soap solution, 17 parts of a watery 10% tobacco extract, 22 parts of a ½ normal-potassium permanganate solution, 17 parts of vegetable glue, and about ¼ to 2 parts of alcohol such as is used as a fuel. These substances are thoroughly intermingled at ordinary temperature in the following succession: soap, cresol soap solution, tobacco-lye, potassium permanganate solution, glue and alcohol.

I am aware that the components of my improved insecticide have been used individually or in partial combination, and ordinarily in mixture with numerous other substances as a composition for killing insects and fungi and other purposes. However, most of the known compositions contain substances such as carbolic acid, calcium carbide, chloride of lime, caustic alkalis or alkaline earths, sublimates, acids, strong alcohols, etc., which substances would destroy the young shoots and leaves or would impair their healthy appearance. Other compositions have been used as softening media into which, for example, shoots of vine or vine plants have been placed prior to planting for about 72 hours, for killing the vine louse and its brood. By means of such compositions obnoxious insects and fungi found on trees, shrubs and other plants can not be destroyed merely by spraying, because the said compositions are not sufficiently effective. Other compositions can be used only in the form of powder or a coating applied to the tree by means of a brush, which is expensive and tiresome.

I have found that the above objections are avoided by my improved composition, which composition is very efficient and non-poisonous, and with exception of the beetle "novius cardinalis" it is the only absolutely effective insecticide killing the yceria purchasi (pemphigus).

The potassium permanganate is added not only for intensifying the disinfecting property of the composition, but also for uniformly binding the substances.

I claim:

The herein described composition for destroying obnoxious insects and fungi, which consists of a mixture of 33 parts of soft soap, 11 parts of a 2% cresol soap solution, 17 parts of a 10% watery tobacco extract, 22 parts of a ½ normal-potassium permanganate solution, 17 parts of vegetable glue, and from ¼ to 2 parts of alcohol.

PAUL JANKE.